US006248446B1

(12) United States Patent
Kikuchi et al.

(10) Patent No.: US 6,248,446 B1
(45) Date of Patent: Jun. 19, 2001

(54) NON-HALOGENATED FLAME-RETARDED COVERED WIRE

(75) Inventors: Norio Kikuchi; Yasuo Kanamori, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/436,471

(22) Filed: Nov. 8, 1999

(30) Foreign Application Priority Data

Nov. 9, 1998 (JP) ..................... 10-318054
Nov. 4, 1999 (JP) ..................... 11-313643

(51) Int. Cl.[7] ..................... B32B 25/00
(52) U.S. Cl. ..................... 428/383; 428/372; 428/379; 174/120 SR; 174/121 A
(58) Field of Search ..................... 428/379, 383, 428/372; 174/120 SR, 121 A

(56) References Cited

U.S. PATENT DOCUMENTS 4,918,127 * 4/1990 Adur et al. ..................... 524/415

FOREIGN PATENT DOCUMENTS 36 06 683 9/1987 (DE) .
43 00 795 7/1994 (DE) .
1-302611 12/1989 (JP) .
3-254015 11/1991 (JP) .
10340635 * 12/1998 (JP) .
10340639 * 12/1998 (JP) .

OTHER PUBLICATIONS

Derwent Abstract ACC–No 1979–03034, 1979.*
Database WPI; Section Ch, Week 199430, Derwent Publications, Ltd., XP0021523221 (abstract only) & JP06 176631, Jun. 24, 1994.
Database WPI; Section Ch, Week 199146, Derwent Publications, Ltd., XP00215322 (abstract only) & JP03 226918, Oct. 7, 1991.

* cited by examiner

*Primary Examiner*—N. Edwards
*Assistant Examiner*—J. M. Gray
(74) *Attorney, Agent, or Firm*—Armstrong, Westerman, Hattori, McLeland & Naughton, LLP

(57) ABSTRACT

A non-halogenated flame-retarded covered wire is provided which includes a conductor and an insulating cover layer consisting of a first layer directly put into contact with the conductor and a second layer arranged outside the first layer, wherein the first layer is made of a flame-retarded polyolefin composition with Shore D hardness of under 60 and Oxygen Index of 24% and over, the second layer is made of a polyolefin composition with Shore D hardness of 60 and over, and thicknesses of the first and second layers are 30 $\mu$m and over and between 65 $\mu$m and 150 $\mu$m, respectively. Thus, a non-halogenated flame-retarded covered wire, which is lightweight and is capable of diameter-reducing and wherein all of abrasion resistance, flame retardance, oil resistance, and bending resistance can be satisfied as a thin layer covered wire for motor vehicle use, can be realized.

11 Claims, 1 Drawing Sheet

NON-HALOGENATED FLAME-RETARDED COVERED WIRE

BACKGROUND OF THE INVENTION

1. Field of the Invention

The present invention relates to a non-halogenated flame-retarded covered wire which is used in a field such as motor vehicle wherein flame retardance is required especially.

2. Description of the Related Art

A thin layer covered wire for motor vehicle use is arranged in a narrow space inside a motor vehicle and is always in an environment of vibration, oil and the like. That is, the thin layer covered wire for motor vehicle use is required to bear the severe condition, which is not required for a general covered wire, and further flame retardance, lightweight, and recently halogen-free as an environmental problem measures are required.

A polyolefin covered wire having a covered layer including a large quantity of magnesium hydroxide as a non-halogen flame retardant has come into use for satisfying such a requirement.

The addition of a large quantity of magnesium hydroxide, however, lowers other properties such as abrasion resistance and oil resistance which are required for a covered wire for motor vehicle use. Therefore, it is difficult to reduce a thickness of an insulating cover layer to 200 $\mu$m which is applied to a polyvinyl chloride covered wire, and, at present, it is even difficult to make the thickness less than 300 $\mu$m, thereby leaving problems of arrangeability, weight and thickness.

SUMMARY OF THE INVENTION

In view of the foregoing, an object of the present invention is to provide a non-halogenated flame-retarded covered wire which is lightweight and is capable of diameter-reducing, wherein all of abrasion resistance, flame retardance, oil resistance, and bending resistance can be satisfied as a thin layer covered wire for motor vehicle use.

In order to achieve the above-described object, as a first aspect of the present invention, a non-halogenated flame-retarded covered wire includes: a conductor; and an insulating cover layer made up of a first layer directly put into contact with the conductor and a second layer arranged outside the first layer, wherein the first layer is made of a flame-retarded polyolefin composition with Shore D hardness of under 60 and Oxygen Index of 24% and over, the second layer is made of a polyolefin composition with Shore D hardness of 60 and over, and thicknesses of the first and second layers are 30 $\mu$m and over and between 65 $\mu$m and 150 $\mu$m, respectively.

As a second aspect of the present invention, in the structure with the above first aspect, a thickness of the insulating cover layer is 180 $\mu$m and over.

As a third aspect of the present invention, in the structure with the above first or second aspect, the polyolefin composition constituting the second layer does not have an inorganic filler nor an inorganic flame retardant.

As a fourth aspect of the present invention, in the structure with any one of the above first to third aspects, a flame retardant added to the flame-retarded polyolefin composition constituting the first layer is magnesium hydroxide.

As a fifth aspect of the present invention, a non-halogenated flame-retarded covered wire includes: a conductor; and an insulating cover layer made up of a first layer directly put into contact with the conductor and a second layer arranged outside the first layer, wherein the first layer is made of a flame-retarded polyolefin composition with Shore D hardness of under 60 and Oxygen Index of 24% and over, the second layer is made of a polyolefin composition with Shore D hardness of 60 and over, a thickness of the insulating cover layer is 180 $\mu$m and over, and a thickness of the second layer is between 65 $\mu$m and 150 $\mu$m.

As a sixth aspect of the present invention, in the structure with the above first or fifth aspect, the conductor is a soft copper stranded wire.

As described above, the non-halogenated flame-retarded covered wire in accordance with the present invention is excellent in abrasion resistance, flame retardance, oil resistance, and bending resistance, and simultaneously is capable of stable production. And, with all the above properties, the insulating cover layer of the non-halogenated flame-retarded covered wire can be thinner than the conventional one, whereby the wire can be lightened. Therefore, the non-halogenated flame-retarded covered wire in accordance with the present invention is exceedingly suitable for the thin layer covered wire for motor vehicle use.

The above and other objects and features of the present invention will become more apparent from the following description taken in conjunction with the accompanying drawings.

DESCRIPTION OF THE PREFERRED EMBODIMENTS

Figure 1A:
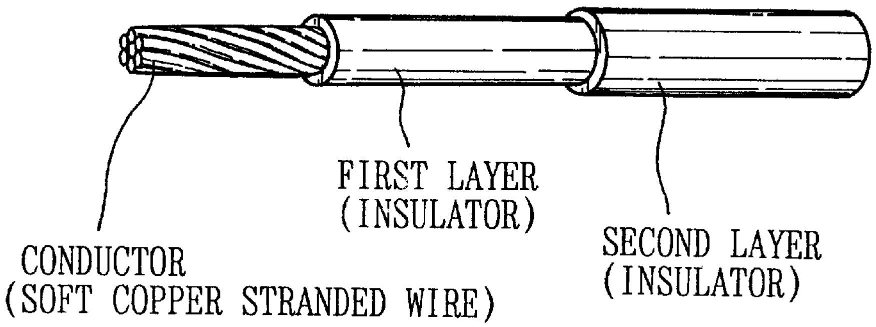
FIG. 1A is a perspective view an embodiment of a non-halogenated flame-retarded covered wire in accordance with the present invention.

In a non-halogenated flame-retarded covered wire according to the present invention, an outer diameter of 3.10 mm and under is required and that of 2.60 mm and under is preferable. Sufficient bending resistance can not be obtained in case of an outer diameter over 3.10 mm. A non-halogenated flame-retarded covered wire with an outer diameter of 3.10 mm and under can be applied to a wire for motor vehicle wherein very severe condition is expected.

And, in a non-halogenated flame-retarded covered wire according to the present invention, all conductor materials can be applied to the conductor. That is, though a stranded wire or a single wire is not a mater, a stranded wire is preferable, taking bending resistance required for the thin layer covered wire for motor vehicle use into consideration.

An first layer of the insulating cover layer is formed to contact and surround the conductor. In the present invention, the first layer is required to be made of a flame-retarded polyolefin composition (i.e. a first layer resin composition) with Shore D hardness of under 60 and Oxygen Index of 24% and over. A resin composition with Shore D hardness of 60 and over is not for practical use because of low bending resistance.

The reason that the resin composition needs Oxygen Index of 24% and over is that the thin layer covered wire for motor vehicle use severely requires flame retardance but the resin composition is short of flame retardance if Oxygen Index is under 24%.

Magnesium hydroxide, aluminum hydroxide, or the like, which is generally used as a flame retardant in a polyolefin covered wire, can be used as a flame retardant. One or a plurality of flame retardants should be a base resin (polyolefin), which is uniformly mixed by a mixing means such as a kneader or the like and is used as the first layer resin composition.

Magnesium hydroxide is preferable as the flame retardant when wire manufacturing conditions including a mixing temperature or the like is taken into consideration.

A resin composition constituting a second layer shall be a polyolefin composition with Shore D hardness of 60 and over. Sufficient abrasion resistance can not be obtained in case of Shore D hardness of under 60. The resin composition constituting the second layer (a second layer resin composition) shall preferably be one not having an inorganic filler or not having an inorganic flame retardant. In case that the above inorganic filler or inorganic flame retardant is added, tuning-white is apt to arise when the wire is strongly bent.

Both of the base resins of the resin compositions of the first and second layers shall be polyolefin. That is, using polyolefin as the base resin of the first layer resin composition enables the base resin to be sufficiently filled with the inorganic filler or the inorganic flame retardant, whereby the first layer resin composition exhibits excellent flame retardance as the cover of wire. On the other hand, using the same kind of polyolefin as the first layer resin composition for the second layer enables both of the layers constituting the insulating cover layer to melt and to be completely united, whereby an excellent covered wire fully satisfying flame retardance, abrasion resistance, bending resistance, and the like can be obtained even though the cover is halogen-free. Polyethylene, polypropylene, and the like are given as polyolefin, and especially polypropylene is preferable because of excellence in heat transformation.

Though various kinds of polyolefin being different in molecular weight or in the properties are widely available, polyolefin for the first layer shall be selected taking the properties due to addition of a flame retardant into consideration.

A covered wire is formed by an extruder with use of the conductor, the first layer resin composition, and the second layer resin composition.

A thickness of the second layer shall be between 65 μm and 150 μm. In case of under 65 μm abrasion resistance lowers, whereas in case of over 150 μm sufficient flame retardance can not be obtained and simultaneously bending resistance lowers thereby to bring about turning-white easily. Here, the turning-white of the insulating cover layer is due to an occurrence of micro-crack, which would lower insulating property of the insulating cover layer.

Further, in case of a general thin layer covered wire for motor vehicle use, a thickness of the insulating cover layer consisting of the first layer and the second layer shall be 180 μm and over. In case of under 180 μm, its bending resistance lowers. Under the circumstances where bending resistance is not required, the thickness of the insulating cover layer can be reduced. In this case, however, a thickness of the first layer shall be 30 μm and over for satisfying the other properties and for stable production.

And, a thickness of the insulating cover layer is required to be 400 μm and under. In case of over 400 μm, since an outer diameter of the wire becomes large when the wire is bent by 180°, bending resistance of the wire lowers.

Conventionally, a thickness of the insulating cover layer of a normally used thin layer covered wire for motor vehicle use is in a range of 200 μm to 350 μm, wherein stable production of a non-halogenated flame-retarded covered wire satisfying sufficient abrasion resistance, oil resistance, and flame retardance has been difficult. In case of the non-halogenated flame-retarded covered wire in accordance with the present invention, if the insulating cover layer has a thickness of at least 180 μm, stable production of the covered wire having sufficient properties is possible. In case that the insulating cover layer has a thickness of 200 μm, the required properties can be easily satisfied.

Embodiments of the present invention will now be described in further detail.

The material resin and the inorganic flame retardant shown in TABLE 1 are used.

First layer flame-retarded resin compositions with various Oxygen Indexes and hardnesses have been obtained from resin 1 or resin 2 and a flame retardant with use of a kneader by changing a mixing ratio.

Also, second layer resin compositions with various hardnesses have been obtained from resin 1 and resin 2 by changing a mixing ratio.

TABLE 1

| | |
|---|---|
| Resin 1 | CAP330 by UBE Industries, LTD. (propylene monomer based polyolefin with low-crystallizing property) |
| Resin 2 | CAP34O by UBE Industries, LTD. (propylene monomer based polyolefin with low-crystallizing property) |
| Resin 3 | F132 by Grand Polymer Co., Ltd. (polypropylene) |
| Flame Retardant | powdered magnesium hydroxide |

Figure 1B:
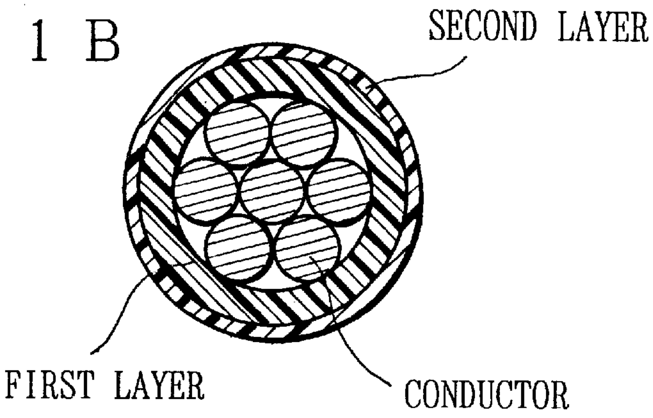
FIG. 1B is a cross-sectional view of the non-halogenated flame-retarded covered wire of FIG. 1A.

The covered wire shown in FIGS. 1A and 1B is made up of the first layer flame-retarded resin composition, the second layer resin composition, and the conductor. The conductor is a soft copper stranded wire having a diameter of 0.90 mm. The soft copper stranded wire is manufactured by stranding seven copper wires each having a diameter of 0.32 mm and by compressing it. Hardness, Oxygen Index (measured in conformity to JIS•K7201), and Shore D hardness of the first layer flame-retarded resin composition and of the second layer resin composition, thickness of the second layer, thickness of the insulating cover layer, and wire outer diameter are shown in TABLE 2 and TABLE 3.

Further, evaluation result of the manufactured wires is also shown in these TABLE 2 and TABLE 3. To put it concretely, as the wire manufacturing properties, "○" indicates that thickness control of each layer was possible at the manufacturing process, and "×" indicates that the control was difficult. The following evaluation was not executed to the items having "×" in the wire manufacturing properties.

Abrasion resistance was measured in conformity to JASO (i.e. Japanese Automobile Standard Organization)•D611-94, 5.11(2). That is, a piano wire having a diameter of 0.45 mm and a weight of 5N was applied. Number of back-and-forth movement of the piano wire was measured until the piano wire got in contact with the conductor due to abrasion of an insulator, i.e. the insulating cover layer. And, the insulating cover layer which could bear at least 300 times of the movement defined above was specified as "a pass" and indicated with "○", and the layer which could not bear 300 times of the movement was specified as "a reject" and indicated with "×".

And, flame retardance was measured also in conformity to JASO•D611-94,5.9. The insulating cover layer in which fire went out within 15 seconds was specified as "a pass" and indicated with "○", and the layer in which fire did not go out within 15 seconds was specified as "a reject" and indicated with "×".

Further, bending resistance was evaluated as follows. That is, the wire was bent by 180°, and then an occurrence of initial turning-white, specifically an occurrence of micro-crack, at the bent portion was visually investigated. The insulating cover layer in which the initial tuning-white did not occur was specified as "a pass" and indicated with "○", and the layer in which the initial turning-white occurred was specified as "a reject" and indicated with "×". Still further, the wire was left alone in a bent state for three days. And, an occurrence of a crack on the insulating cover layer was checked as "crack-after-leaving" after both ends of the wire had been pulled. The insulating cover layer in which the crack-after-leaving did not occur was specified as "a pass" and indicated with "○", and the layer in which the crack-after-leaving occurred was specified as "a reject" and indicated with "×".

Finally, oil resistance was evaluated as follows. That is, the insulating cover layer, whose conductor had been extracted, having a length of 150 mm was soaked in an engine oil of 70° C. for 24 hours, while leaving 25 mm at both ends of the insulating cover layer. And, the insulating cover layer was taken out of the oil, and then the oil leaving over the surface was wiped out. After the insulating cover layer had returned in a state of normal temperature, its tensile strength and elongation were measured by a tensile tester. A rate of change relative to the material not soaked in the engine oil was obtained, and the insulating cover layer in which the rate of change was within ±10% was specified as "a pass" and indicated with "○", and the layer in which the rate of change was not within ±10% was specified as "a reject" and indicated with "×".

TABLE 2

| | | Embodiment | | | | | |
|---|---|---|---|---|---|---|---|
| Item | Unit | 1 | 2 | 3 | 4 | 5 | 6 |
| First Layer Flame-Retarded Resin Composition | | | | | | | |
| Applied Resin | — | resin 1 | resin 1 | resin 2 | resin 2 | resin 1 | resin 1 |
| Shore D Hardness | — | 59 | 59 | 50 | 59 | 59 | 69 |
| Oxygen Index | — | 24 | 24 | 24 | 27 | 24 | 24 |
| Second Layer Resin Composition | | | | | | | |
| Shore D Hardness | — | 60 | 60 | 60 | 60 | 70 | 60 |
| Thickness of Second Layer | μm | 65 | 150 | 65 | 65 | 65 | 65 |
| Thickness of Insulating Cover Layer (First Layer + Second Layer) | μm | 180 | 180 | 180 | 180 | 180 | 200 |
| Wire Diameter | mm | 1.26 | 1.26 | 1.26 | 1.26 | 1.26 | 1.30 |
| Wire Manufacturability | — | ○ | ○ | ○ | ○ | ○ | ○ |
| Abrasion Resistance | — | ○ | ○ | ○ | ○ | ○ | ○ |
| Flame Retardance | — | ○ | ○ | ○ | ○ | ○ | ○ |
| Oil Resistance (Engine Oil) (70° C. × 24 hrs.) | | | | | | | |
| Rate of Change of Tensile Strength | — | ○ | ○ | ○ | ○ | ○ | ○ |
| Rate of Change of Elongation | — | ○ | ○ | ○ | ○ | ○ | ○ |
| Bending Resistance | | | | | | | |
| Initial Turning-white | — | ○ | ○ | ○ | ○ | ○ | ○ |
| Crack-after-leaving | — | ○ | ○ | ○ | ○ | ○ | ○ |

TABLE 3

| | | Compared Example | | | | | |
|---|---|---|---|---|---|---|---|
| Item | Unit | 1 | 2 | 3 | 4 | 5 | 6 |
| First Layer Flame-Retarded Resin Composition | | | | | | | |
| Applied Resin | — | resin 1 | resin 1 | resin 2 | resin 1 | resin 1 | resin 1 |
| Shore D Hardness | — | 63 | 56 | 50 | 59 | 59 | 59 |
| Oxygen Index | — | 24.5 | 23 | 24 | 24 | 24 | 24 |
| Second Layer Resin Composition | | | | | | | |
| Shore D Hardness | — | 60 | 60 | 57 | 60 | 60 | 60 |
| Thickness of Second Layer | μm | 65 | 150 | 65 | 60 | 155 | 150 |
| Thickness of Insulating Cover Layer (First Layer + Second Layer) | μm | 180 | 180 | 180 | 180 | 185 | 175 |
| Wire Diameter | mm | 1.26 | 1.26 | 1.26 | 1.26 | 1.26 | 1.25 |
| Wire Manufacturability | — | ○ | ○ | ○ | ○ | ○ | x |

TABLE 3-continued

| Item | Unit | Compared Example | | | | | |
|---|---|---|---|---|---|---|---|
| | | 1 | 2 | 3 | 4 | 5 | 6 |
| Abrasion Resistance | — | ○ | ○ | x | x | ○ | — |
| Flame Retardance | — | ○ | x | ○ | ○ | x | — |
| Oil Resistance (Engine Oil) (70° C. × 24 hrs.) | | | | | | | |
| Rate of Change of Tensile Strength | — | ○ | ○ | ○ | ○ | ○ | — |
| Rate of Change of Elongation | — | ○ | ○ | x | ○ | ○ | — |
| Bending Resistance | | | | | | | |
| Initial Turning-white | — | ○ | ○ | ○ | ○ | ○ | — |
| Crack-after-leaving | — | x | ○ | ○ | ○ | x | — |

Referring to TABLE 2 and TABLE 3, the non-halogenated flame-retarded covered wire in accordance with the present invention is excellent in abrasion resistance, flame retardance, oil resistance, and bending resistance, and simultaneously is capable of stable production, lightening, and diameter-reducing.

The non-halogenated flame-retarded covered wire in accordance with the present invention has the above excellent properties even though a thickness of its insulating cover layer is 180 μm which is thinner than that of the conventional thin polyvinyl chloride covered wire for motor vehicle use, i.e. 200 μm. Therefore, embodiments 1 to 6, shown in TABLE 2, of the non-halogenated flame-retarded covered wire are exceedingly suitable for the thin layer covered wire for motor vehicle use.

The wires of the embodiments 1 to 6 were practically tested in arranging them in a motor vehicle and, as the result, the wires each were much easier to be arranged in the motor vehicle than the conventional non-halogenated flame-retarded covered wire having the thick insulating cover layer. And simultaneously, the wires each did not have any trouble with the insulating cover layers.

Further, conductors α, β and γ were prepared. The conductor α, which is manufactured by stranding thirty seven (37) copper wires each having a diameter of 0.26 mm and by compressing it, is a soft copper stranded wire (diameter 1.80 mm), the conductor β, which is manufactured by stranding fifty eight (58) copper wires each having a diameter of 0.26 mm and by compressing it, is a soft copper stranded wire (diameter 2.30 mm), and the conductor γ, which is manufactured by stranding ninety eight (98) copper wires each having a diameter of 0.26 mm and by compressing it, is a soft copper stranded wire (diameter 2.90 mm). And, a non-halogenated flame-retarded covered wire A (outer diameter 2.60 mm), a non-halogenated flame-retarded covered wire B (outer diameter 3.10 mm), and a non-halogenated flame-retarded covered wire C (outer diameter 3.70 mm) were manufactured with use of the respective soft copper stranded wires α, β and γ, similarly to the embodiment 1 of TABLE 2. And then, the wires A,B, and C were evaluated according to the items of TABLE 2. As the result, though an initial turning-white and a crack-after-leaving arose in the non-halogenated flame-retarded covered wire C at bending resistance, the wires A and B were satisfactory in all the items. Generally, a conductor with an outer diameter between 0.7 mm and 1.8 mm is applied to a thin layer low voltage wire for motor vehicle.

Still further, thickness of the insulating cover layer was studied.

A non-halogenated flame-retarded covered wire D with an insulating cover layer thickness of 300 μm, a non-halogenated flame-retarded covered wire E with an insulating cover layer thickness of 400 μm, and a non-halogenated flame-retarded covered wire F with an insulating cover layer thickness of 450 μm were manufactured with the same conditions as the embodiment 1 of TABLE 2, however, with changing a thickness of the first layer.

And then, the wires D,E, and F were evaluated according to the items of TABLE 2. As the result, though an initial turning-white and a crack-after-leaving arose in the non-halogenated flame-retarded covered wire F at bending resistance, the wires D and E were satisfactory in all the items.

In addition, the wires each having a thickness of the first layer of 30 μm and a thickness of the insulating cover layer of 95 μm were evaluated similarly to the embodiments 1 to 6 of TABLE 2. As the result, though a little initial turning-white arose on the insulating cover layers at 180° bending resistance evaluation, they passed the other properties' evaluation described above. And, insulating property of the these insulating cover layers was evaluated in conformity to JASO D611-94, 5.3(2), and their sufficient insulating property were recognized. Therefore, it can be described that the above wires each having a thickness of the first layer of 30 μm and a thickness of the insulating cover layer of 95 μm can be utilized for other than a thin layer covered wire for motor vehicle wherein very severe conditions are required.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A non-halogenated flame-retarded covered wire, comprising:

a conductor; and an insulating cover layer made up of a first layer directly put into contact with said conductor and a second layer arranged outside said first layer, wherein said first layer is made of a flame-retarded polyolefin composition with Shore D hardness of under 60 and Oxygen Index of 24% and over, said second layer is made of a polyolefin composition with Shore D hardness of 60 and over, and thicknesses of said first and second layers are 30 μm and over and between 65 μm and 150 μm, respectively.

2. The non-halogenated flame-retarded covered wire according to claim 1, wherein a thickness of said insulating cover layer is 180 μm and over.

3. The non-halogenated flame-retarded covered wire according to claim 2, wherein said polyolefin composition constituting said second layer does not have an inorganic filler nor an inorganic flame retardant.

4. The non-halogenated flame-retarded covered wire according to claim 3, wherein a flame retardant added to said flame-retarded polyolefin composition constituting said first layer is magnesium hydroxide.

5. The non-halogenated flame-retarded covered wire according to claim 2, wherein a flame retardant added to said flame-retarded polyolefin composition constituting said first layer is magnesium hydroxide.

6. The non-halogenated flame-retarded covered wire according to claim 1, wherein said polyolefin composition constituting said second layer does not have an inorganic filler nor an inorganic flame retardant.

7. The non-halogenated flame-retarded covered wire according to claim 6, wherein a flame retardant added to said flame-retarded polyolefin composition constituting said first layer is magnesium hydroxide.

8. The non-halogenated flame-retarded covered wire according to claim 1, wherein a flame retardant added to said flame-retarded polyolefin composition constituting said first layer is magnesium hydroxide.

9. A non-halogenated flame-retarded covered wire, comprising:

a conductor; and an insulating cover layer made up of a first layer directly put into contact with said conductor and a second layer arranged outside said first layer, wherein said first layer is made of a flame-retarded polyolefin composition with Shore D hardness of under 60 and Oxygen Index of 24% and over, said second layer is made of a polyolefin composition with Shore D hardness of 60 and over, a thickness of said insulating cover layer is 180 μm and over, and a thickness of said second layer is between 65 μm and 150 μm.

10. The non-halogenated flame-retarded covered wire according to claim 9, wherein said conductor is a soft copper stranded wire.

11. The non-halogenated flame-retarded covered wire according to claim 1, wherein said conductor is a soft copper stranded wire.

* * * * *